United States Patent
Penner

(10) Patent No.: US 7,484,792 B2
(45) Date of Patent: Feb. 3, 2009

(54) GLOVE BOX ASSEMBLY EXHIBITING KNEE IMPACT FORCE TRANSFERRING STRUCTURE WITH RESPECT TO AN ASSOCIATED VEHICLE DASH/INSTRUMENT PANEL AND REINFORCING BAR

(75) Inventor: Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 185 days.

(21) Appl. No.: 11/349,503

(22) Filed: Feb. 7, 2006

(65) Prior Publication Data

US 2007/0182189 A1   Aug. 9, 2007

(51) Int. Cl.
  *B60N 3/12* (2006.01)
(52) U.S. Cl. .............................. 296/187.05; 296/37.12; 296/193.02; 280/752
(58) Field of Classification Search ............ 296/187.05, 296/37.12, 70, 193.02; 180/90; 280/752, 280/748
  See application file for complete search history.

(56) References Cited

U.S. PATENT DOCUMENTS

| 4,109,955 | A |   | 8/1978  | Amann et al. ............... 296/37.1 |
|---|---|---|---|---|
| 4,427,215 | A |   | 1/1984  | Weichenrieder et al. ..... 280/752 |
| 4,518,172 | A |   | 5/1985  | Bortz et al. .................. 280/751 |
| 5,071,162 | A |   | 12/1991 | Takagawa ................... 280/752 |
| 5,295,707 | A |   | 3/1994  | Satoh et al. .................. 280/728 |
| 5,482,319 | A |   | 1/1996  | Yoshimura et al. .......... 280/752 |
| 5,810,414 | A |   | 9/1998  | Choquet ................... 296/37.12 |
| 5,904,389 | A | * | 5/1999  | Vaishnav et al. ............ 296/37.1 |
| 6,070,927 | A | * | 6/2000  | Mieglitz et al. ........... 296/37.12 |
| 6,213,504 | B1| * | 4/2001  | Isano et al. .................. 280/748 |
| 6,299,208 | B1|   | 10/2001 | Kasahara et al. ............ 280/752 |
| 6,896,308 | B2|   | 5/2005  | Okanda et al. ........... 296/37.12 |
| 2003/0129418 | A1| * | 7/2003  | Tamura ....................... 428/432 |
| 2004/0041385 | A1| * | 3/2004  | Garnweidner et al. ........ 280/752 |
| 2004/0124623 | A1| * | 7/2004  | Yamazaki .................... 280/752 |
| 2005/0062276 | A1| * | 3/2005  | Nagata et al. ................ 280/752 |
| 2005/0116449 | A1| * | 6/2005  | Enders ..................... 280/730.1 |
| 2005/0194773 | A1| * | 9/2005  | Yamada et al. .............. 280/752 |
| 2006/0038390 | A1|   | 2/2006  | Cho .......................... 280/752 |
| 2006/0232055 | A1| * | 10/2006 | Cappabianca et al. ....... 280/752 |
| 2007/0182145 | A1| * | 8/2007  | Penner ....................... 280/752 |
| 2007/0205624 | A1| * | 9/2007  | Zellner et al. ............ 296/37.12 |

FOREIGN PATENT DOCUMENTS

JP                06087391         3/1994

* cited by examiner

*Primary Examiner*—Jason S Morrow
(74) *Attorney, Agent, or Firm*—Gifford, Krass, Sprinkle, Anderson & Citkowski, P.C.

(57) ABSTRACT

A glove box assembly incorporated into a vehicle instrument panel, along which extends a reinforcing bar. The assembly includes a three-dimensional and interiorly open receptacle fixedly mounted within the instrument panel. The receptacle includes one or more integrally formed structural projections extending from a rear side thereof and in a direction towards the reinforcing bar, typically spaced a slight distance from the receptacle structure. A bin secures within the glove box receptacle and includes a door exposed to adjoining surfaces of the instrument panel. Upon experiencing a collision event resulting in a passenger's knees impacting the door, inward deformation of the receptacle transfers forces both to the instrument panel and through deforming the reinforcing bar.

18 Claims, 5 Drawing Sheets

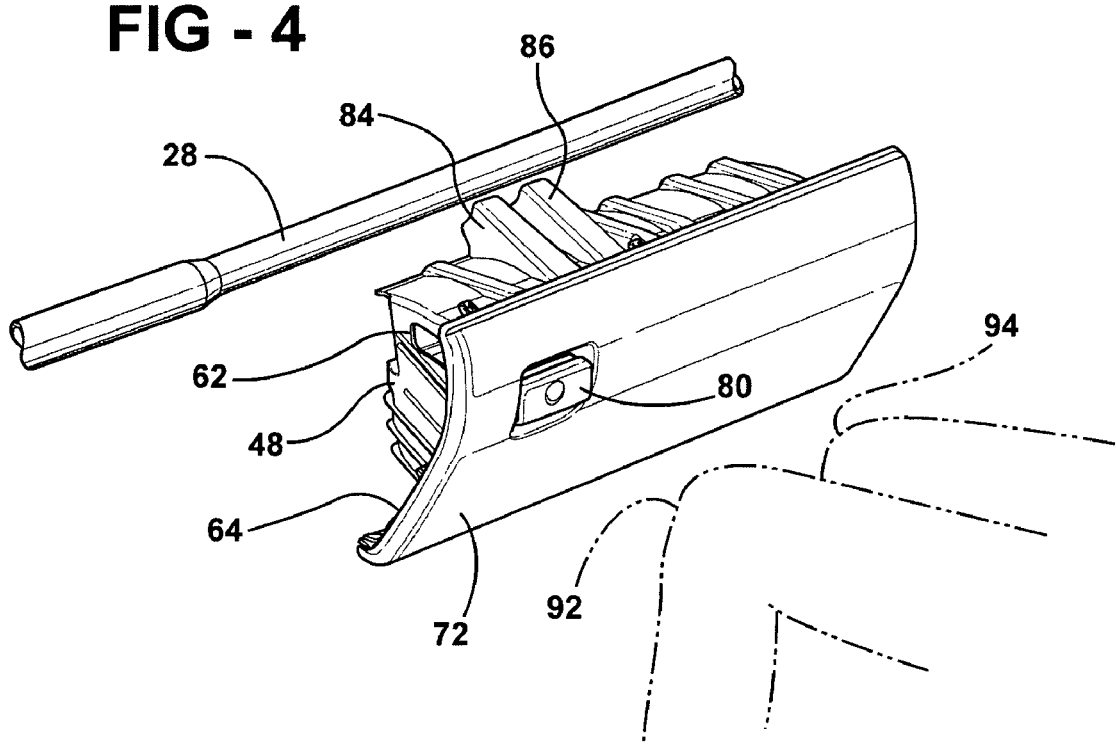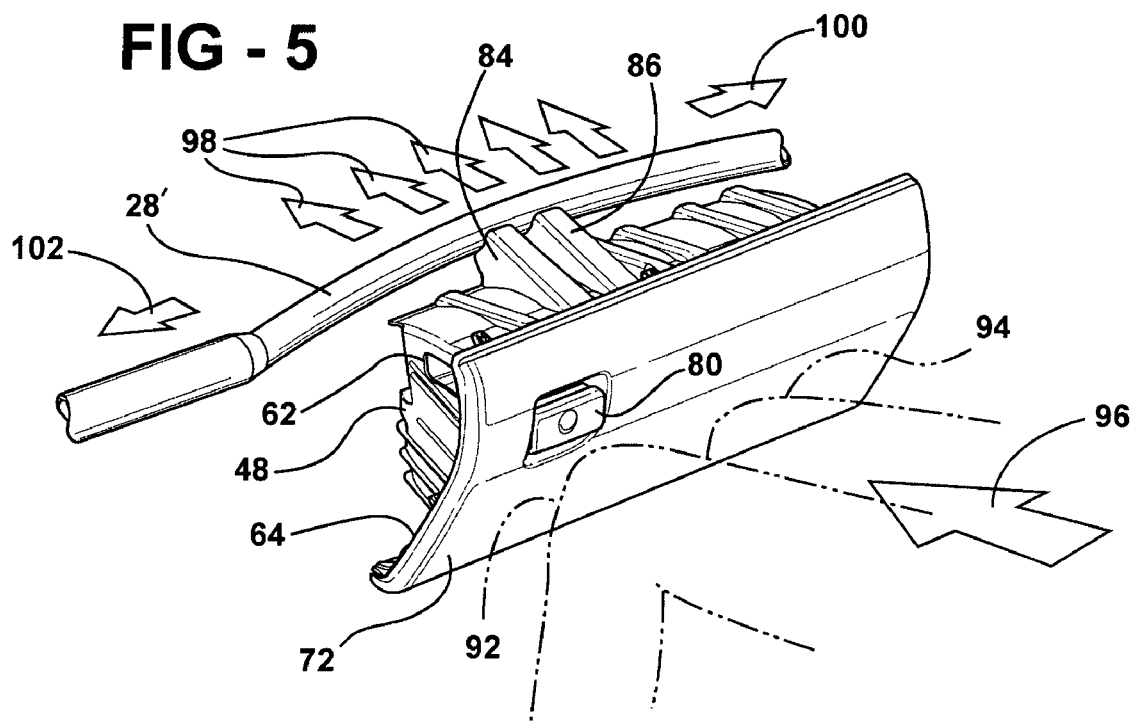

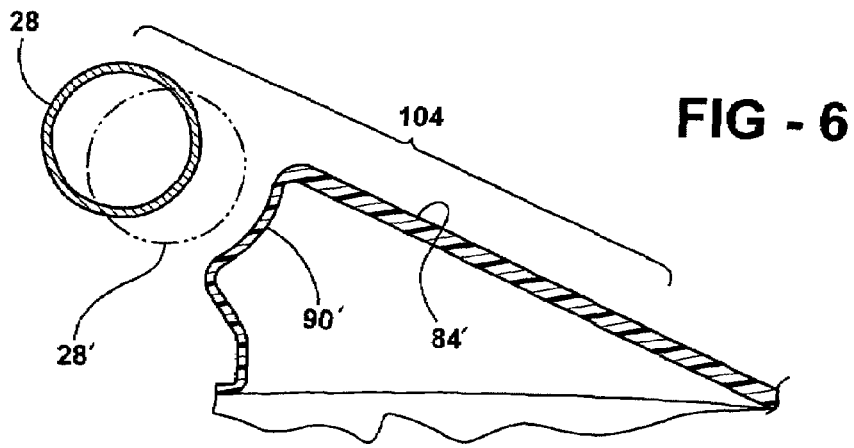
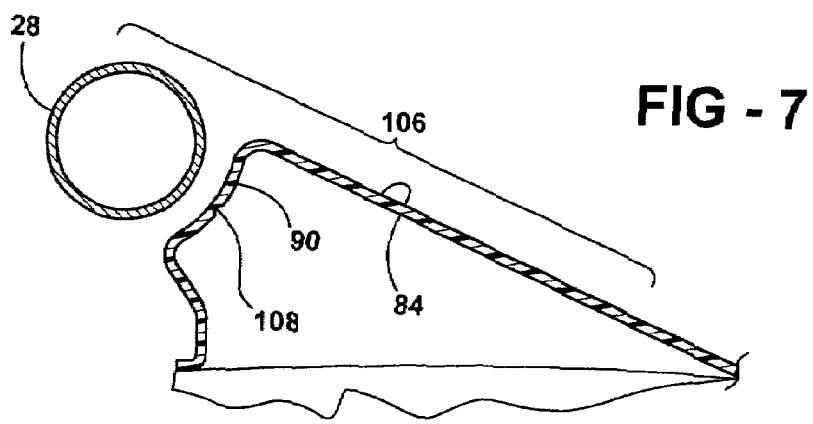
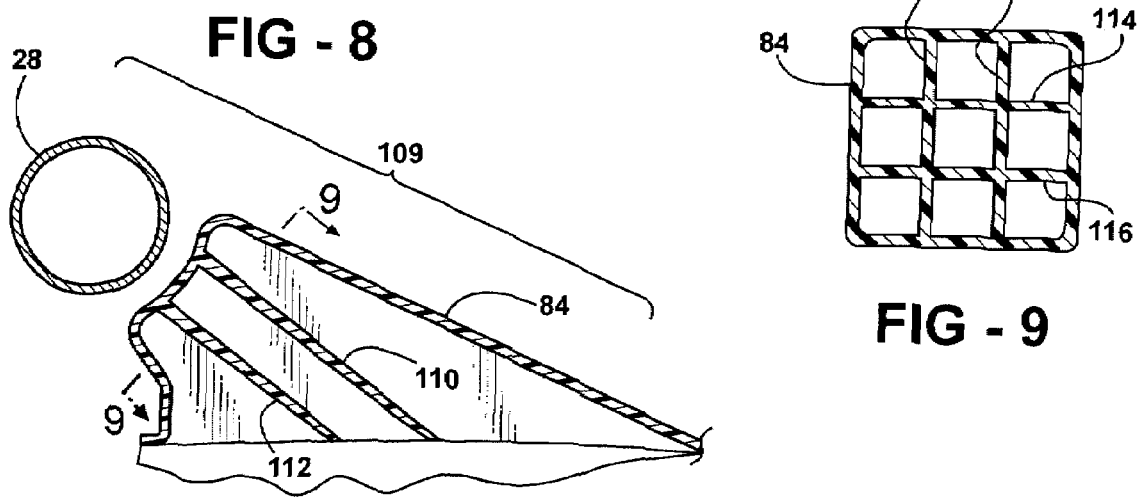

GLOVE BOX ASSEMBLY EXHIBITING KNEE IMPACT FORCE TRANSFERRING STRUCTURE WITH RESPECT TO AN ASSOCIATED VEHICLE DASH/INSTRUMENT PANEL AND REINFORCING BAR

BACKGROUND OF THE INVENTION

1. Field of the Invention

The present invention relates generally to a passenger side located glove box assembly exhibiting specific impact deforming and force transferring properties. More specifically, the present invention discloses a glove box assembly including a three-dimensional recessed component mounted within the vehicle dash/instrument panel assembly.

Upon experiencing forward directed forces, associated with the passenger's knees impacting a door of the glove box, these forces are initially transferred to the surrounding and supporting instrument panel structure. Additional forwardly directed impact forces are transferred from extending structural portions associated with the glove box inner receptacle, upon the same being forwardly deformed into abutting contact with the vehicle's laterally extending structural reinforcing bar.

In this manner, the structural projections associated with the glove box's fixed inner receptacle serve to transfer significant load during a crash situation to non-critical vehicle locations supporting the reinforcing bar, such as the doors, steering column support and the like. A further advantage of this design is that it provides balance between the counterforces exerted by a passenger actuating airbag (upper torso forces) and those responsible for the controlled deformation and lower collapse of the glove box door and inner assembly (lower body forces).

2. Description of the Prior Art

The prior art is well documented with various occupant knee impact assemblies, these typically associated with a passenger side of a vehicle and calculated to transfer lower body forces associated with a frontal impact event. The objective of such designs is to transfer as much force as possible away from the occupant to the vehicle, in as controlled a fashion as possible and in order to minimize injury.

Conventional bracket structures have been utilized in an attempt to transfer impact forces from the glove box assembly to the IP/dash structure and associated crosswise extending reinforcing bar. Such have included striker brackets and other connecting flange assemblies, the shortcomings of which include the requirement of installing additional hardware as well as the unsatisfactory force deformation and redirection results associated with such designs.

Another example selected from the prior art is disclosed in U.S. Patent Application Publication No. 2004/0124623, to Yamazaki, and which teaches an occupant protection apparatus exhibiting a panel constituting part of a passenger compartment side of an instrument panel, and which is separatable from the IP (instrument panel). The panel is constructed to move (deform) when at least a knee load of an occupant is inputted.

A pair of bracket shaped support members extend in inwardly spaced apart arrangement and between transverse end portions of the panel and a crosswise extending reinforcement. The support members exhibit a rigidity greater than that of the panel and, upon experiencing forward forces associated with a frontal impact, provide additional controlled deformation following inward collapse of the panel, and relative to the rigid extending reinforcing support.

A further example from the prior art is disclosed in U.S. Pat. No. 6,783,156, issued to Chickmenahalli et al., and which teaches a passenger restraint including a knee bolster having receptacles for receiving knee blockers. The knee blockers are multi-celled elements which absorb kinetic energy attributed to collisions of a motor vehicle.

U.S. Pat. No. 5,431,442, issued to Tomita et al., teaches a passenger restraint structure for an automotive vehicle which has a glove box in which at least one face is able to be opened to a passenger compartment and which is attached to an instrument panel so as to be opposed to the knees of a passenger. The glove box includes an intermediate wall connecting a front wall and a rear wall of the glove box. A stiffener member is located between the glove box and a part of a vehicle body and is stiffer than the glove box for absorbing crash energy generated between the passenger and the vehicle body in the running direction of the vehicle. Upon impact, the weaker intermediate wall of the glove box is compressed, deformed and broken, thereby absorbing the crash energy.

U.S. Pat. No. 4,662,649, issued to Ikeda et al., teaches a knee protector in an automobile and which includes an instrument panel arranged in front of a seat within a passenger compartment of the automobile and exiting widthwise of the automobile. The IP includes an opening defined therein, a lid similar in shape to the contour of the opening is supported by the instrument panel for selective closing and opening. A first protector member is provided inside the lid, a pair of pin members being spaced a distance from each other in a direction widthwise of the automobile and secured to the first protector member so as to protrude in a direction close towards the instrument panel. A second protector member is provided inside the instrument panel and includes separate engagement regions defined therein for engagement with the respective pin members when a load acting in a direction frontwardly of the automobile acts on the lid.

Finally, U.S. Pat. No. 5,071,162, issued to Takagawa, teaches a knee bolster including a lid for covering the surface of a glove box mounted in an opening made in a surface of an instrument panel opposed to a passenger's knees and which includes a plate-like shock absorbing member mounted thereon. A reinforcing plate is disposed along the peripheral edge of the opening and opposed to an outer edge of the back of the shock absorbing member. A load bearing member is fixed at one end thereof to a vehicle body and opposed at the other end to the back of the reinforcing plate.

SUMMARY OF THE PRESENT INVENTION

The present invention discloses a glove box assembly including a three-dimensional item holding bin and an associated glove box door, hingedly secured relative to a three-dimensional receptacle fixedly mounted within the surrounding vehicle dash/instrument panel assembly. In particular, the IP mounted glove box receptacle includes at least one depthwise extending structural projection spatially arrayed relative to an instrument panel reinforcing bar extending in crosswise fashion beneath the IP and structurally connected to both interior and side locations of the vehicle body (e.g. frame, passenger side airbag, doors, etc.), as well as structurally interconnecting the vehicle steering column.

Upon experiencing a forward directed force, associated with a collision event and resulting in the passenger's knees impacting a door of the glove box, these forces are initially transferred to the surrounding and supporting instrument panel structure within which the fixed glove box inner receptacle is mounted. Additional forwardly directed impact forces are transferred from the extending structural portions, upon the same being forwardly deformed into abutting contact with the vehicle's laterally extending structural reinforcing bar and following a given degree of initial deformation of the surrounding instrument panel.

In this manner, the structural projections associated with the glove box's fixed inner receptacle operate to deform the reinforcing bar at the points of contact and to transfer significant loads to the non-critical structural support locations to which the reinforcing bar secures. A further advantage of this design is that it provides balance between the counter-forces exerted by a passenger actuating airbag (upper torso forces) and those responsible for the controlled deformation and lower collapse of the glove box door and inner assembly (lower body forces). The deformable glove box assembly further operates to offset the absorptive force requirements associated with an upper body situated vehicle airbag, thereby balancing the individual absorptive requirements of both the airbag and glove box situated opposite the upper and lower body, respectively, of the user.

BRIEF DESCRIPTION OF THE DRAWINGS

Reference will now be made to the attached drawings, when read in combination with the following detailed description, wherein like reference numerals refer to like parts throughout the several views, and in which:

FIG. 4 is an environmental view showing only the glove box assembly and reinforcing bar in pre-impact condition;

FIG. 5 is a successive environmental view to that shown in FIG. 4 and illustrating the inward travel of the glove box assembly, resulting in successive deformation of the reinforcing bar;

FIG. 6 is a partial cutaway illustration showing an alternate configuration whereby a spacing established between the fixed glove box receptacle and reinforcement bar is modified, and/or by which a thickness associated with a given surface of the receptacle projections is modified;

FIG. 7 is a further partial cutaway illustration of another alternate configuration and by which an impacting surface of the receptacle projecting structure is inwardly notched to facilitate a degree of controlled collapse of the hollow interior structure concurrent with exerting a determined deforming force upon the reinforcing bar;

FIG. 8 is a still further partial cutaway illustration of an additional ribbing structure incorporated into the otherwise hollowed interior of the receptacle and integrally molded projecting structure and in order to selectively strengthen the interior of the receptacle structure proximate the impact point with the reinforcement bar; and FIG. 9 is a cutaway view taken along line 9-9 of FIG. 8 and illustrating the interior honeycomb structure of the fixed receptacle structural projections.

DETAILED DESCRIPTION OF THE PREFERRED EMBODIMENTS

Figure 1:
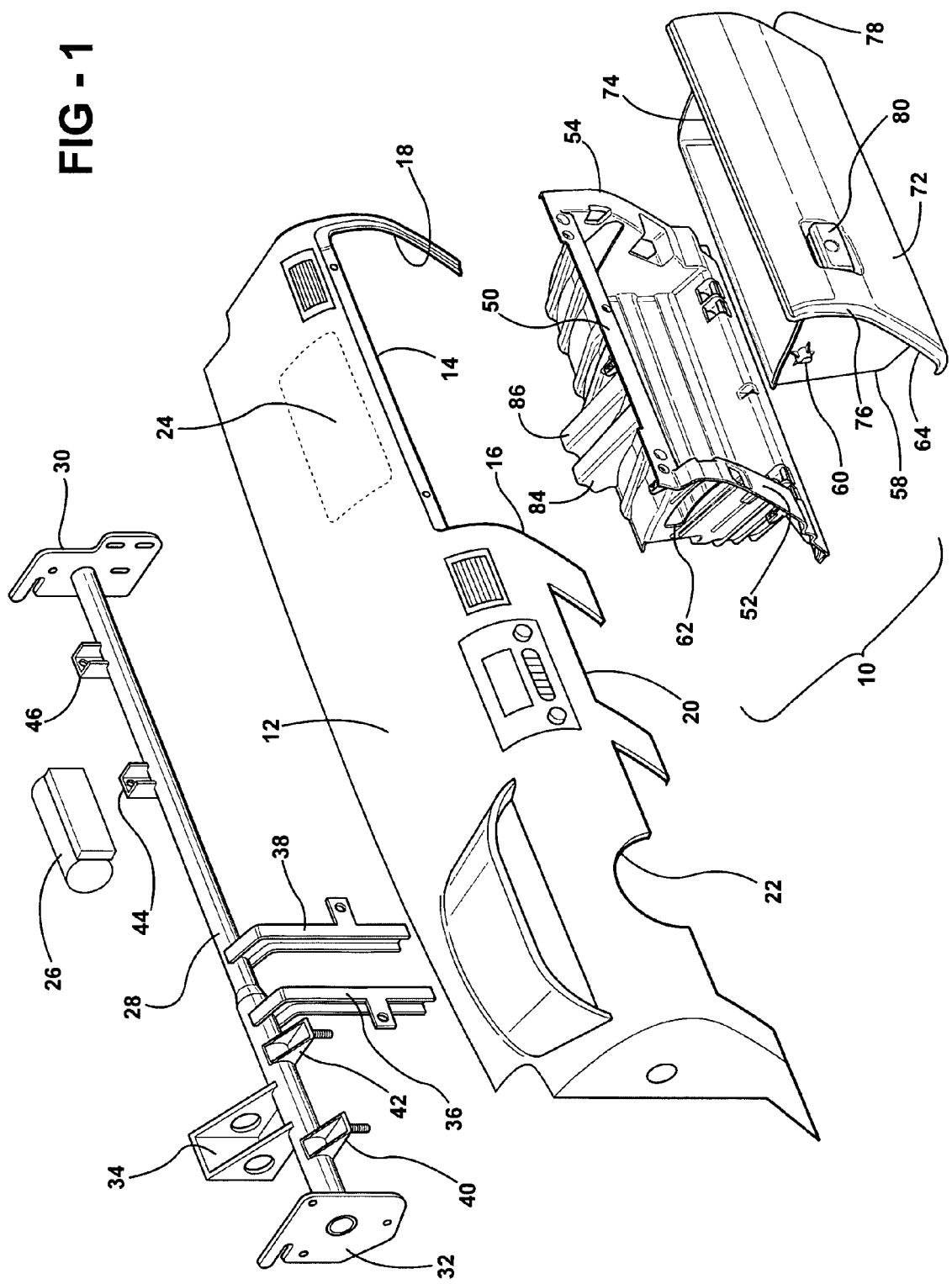
FIG. 1 is an exploded view of the present invention and including the inner structurally configured and outer pivotally secured components of the glove box assembly, the vehicle dash/IP assembly, and its crosswise extending and structurally reinforcing bar according to the present invention.

Referencing now FIG. 1, a glove box assembly is generally referenced at 10 for incorporation into a vehicle instrument panel 12 according to the present invention. As will be subsequently described in further detail, the glove box 10 incorporates a force transferring structure which, in response to a vehicle occupant's knees impacting the glove box, distributes the forces away from the occupant's body, and either alone or in tandem with an upper body actuating and passenger side mounted airbag.

Referring again to FIG. 1, the instrument panel 12 designation generally references the vehicle dash, which references locations including glove box mounting surfaces 14, 16 and 18, ashtray or center console mounting surfaces 20, and steering column mounting location 22. Illustrated in phantom at 24 in FIG. 1 is an outline of a mounting position of a passenger side airbag, also shown in three dimension at 26, and which is secured within the instrument panel 12 interior in such a fashion to be exteriorly deployed in the event of a frontal collision.

A reinforcing bar is referenced at 28 and is secured in widthwise extending fashion along the interior of the instrument panel 12. The reinforcing bar 28 secures at a number of locations to both structural positions associated with the vehicle and other associated components and, as will be subsequently described, is designed to be deformed by the inward collapsing of the glove box in order to increase the force dissipating value of the glove box design.

Referring again to FIG. 1, the reinforcing bar 28 includes first end 30 and second end 32 brackets, such as which are welded to the bar, and which secure in turn to body locations of the vehicle (not shown), such as in particular structural locations associated with the vehicle doors. A further intermediate body securing location is referenced by flange 34 welded or otherwise integrally formed with the bar 28, as well as spaced apart and center console support flanges 36 and 38.

Yet additional support structure is referenced at 40 and 42, extending from other locations of the reinforcing bar 28 proximate the body securing flange 34, and to which is secured an associated steering column structure (not shown) and which projects through the configured mounting location 22 referenced in instrument panel. Finally, the reinforcing bar includes a pair of spaced attachment brackets, see at 44 and 46, to which is supported the associated mounting locations of the passenger side mounted airbag 26.

Figure 2:
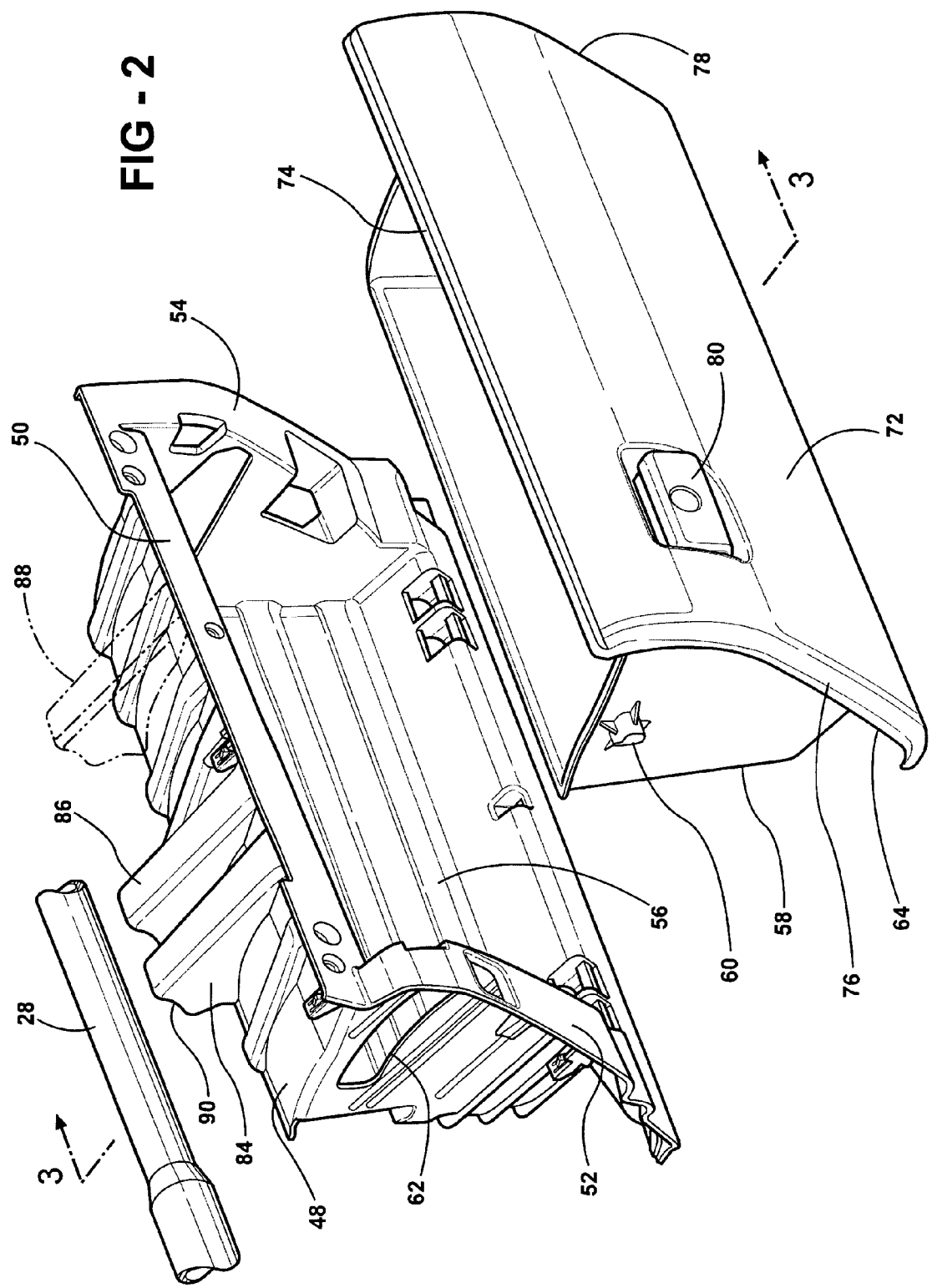
FIG. 2 is an enlarged illustration taken from FIG. 1 and in particular showing the architectural structure of the fixedly mounted inner receptacle with its integrally formed projections.

The glove box assembly 10, as referenced again in FIG. 1 in cooperation with the succeeding enlarged perspective view of FIG. 2, includes a three-dimensional receptacle 48 secured to the instrument panel defined support surfaces 14, 16, and 18, and such that interconnecting outer rim locations 50, 52, and 54 are secured in a desired arrangement within the instrument panel geometry. The receptacle defines an inwardly open interior 56, dimensioned to receive an associated article supporting bin 58 and, along with the bin and its associated door, is constructed of a material such as polypropylene in an injection molding process.

The bin 58 includes at least one side projecting support, see at 60 in FIGS. 1 and 2, and which establishes stop locations in cooperation with a side disposed channel 62 formed within a side of the receptacle 48, and upon the bin 58 being pivotally actuated outwardly from a recessed and latched arrangement within the dashboard to an exposed and opened location whereby the interior contents of the open bin are accessible.

Figure 3:
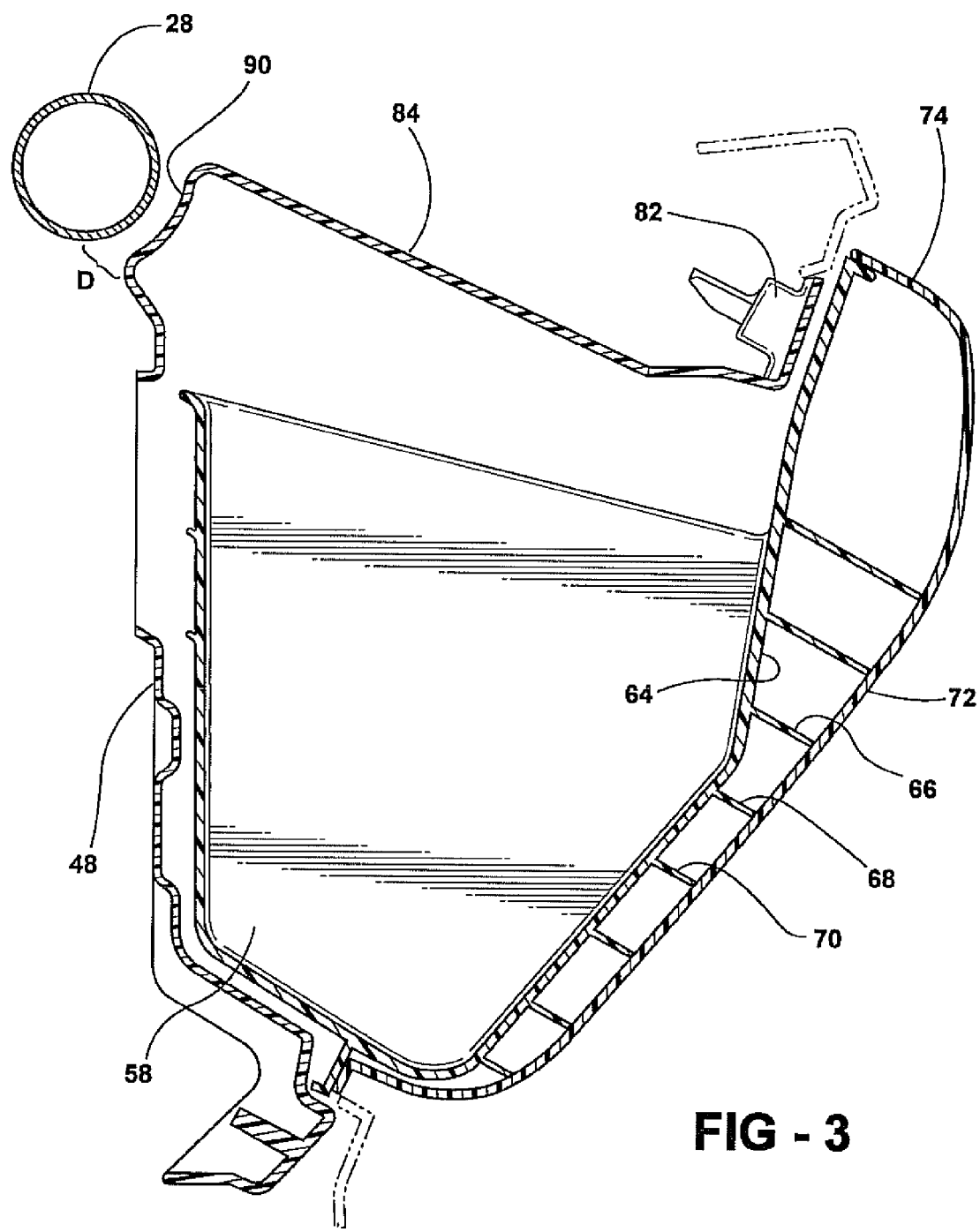
FIG. 3 is a cutaway view taken along line 3-3 of FIG. 2 and illustrating an assembled side profile of the glove box assembly, again showing the rearward structural projections in incrementally spaced and opposing fashion relative to the surface of the IP reinforcing bar.

A door associated with the bin 48 and includes an inner panel 64, see also side cutaway of FIG. 3, and which is secured against locations associated with a forward edge of the bin. As with the bin, the inner panel 64 is typically constructed of a plasticized material formed in an injection molding process and such that the panel 64 exhibits a modified/arcuate planar configuration with a specified length, width and thickness, and generally corresponding to a dimensioned opening in the vehicle dashboard.

The inner panel 64 further includes a plurality of spaced apart and projecting support/stiffening ribs 66, 68, 70, et seq. These are arranged in opposing fashion relative to an outer panel 72, corresponding in overall shape and size to the inner panel 64, and in order that the inner and outer panels are vibrationally welded together, such as along contacting edges of the ribs 66, 68, 70, et seq. against an inner surface of the outer panel 72.

The outer panel 72 may further include inwardly contoured edges 74, 76 and 78, and in order to define a seamless welded construction with the inner panel 64. The outer panel 72 further includes a handle mechanism 80 incorporated into a forward recess associated with the panel 72 and which, in cooperation with a release and force dampening cylinder (not shown) and an interiorly secured and side latch pin type gear box (also not shown) actuates the door and associated bin relative to structure extending from a side of the glove box assembly and communicating with a release/catch latch 82 (see FIG. 3) associated with the upper forward edge 50 of the recessed open receptacle 48.

In its assembled configuration, and as is best shown by side cutaway view of FIG. 3 and succeeding environmental views FIGS. 4 and 5, the supported glove box receptacle 48 includes any number of rearward/inward structural projections, see at 84 and 86 in solid in FIG. 2, as well as optionally/additionally in phantom illustration at 88. These projections each define integral extending portions of the inner receptacle 48, and which is interiorly hollowed within the projections.

Upon assembly, again referencing FIG. 3, each of the individual structural projections (or rearward embossments), includes an inwardly arcuately profiled end surface, see as exemplary shown by inner arcuate end surface 90 associated with rearward structural embossment 84. In a desired embodiment, the receptacle 48 is not secured in any fashion to the reinforcing bar 28, but rather the profiled end surfaces (e.g. at 90) associated with each structural receptacle projection are spaced a desired distance (in one variant approximately 8 mm distance) from the surface of the reinforcement bar 28.

The configuration of the projection end surfaces is such that they substantially mate with the exterior extending configuration of the reinforcing bar 28. As shown in FIG. 5, and upon a determined forward impact event corresponding to an occupant's knees 92 and 94 contacting the door in a direction generally referenced by arrow 96, these forces are initially transferred to the structure of the instrument panel 12 surrounding the mounting locations associated with the glove box assembly.

Upon the glove box (in particular the inner fixed mounted receptacle 48) being inwardly collapsed a desired distance D as shown in FIG. 3 (and again such as the 8 mm separating the reinforcing bar 28 from the rearward embossments/projections 84 and 86), the inner arcuate ends of the structural projections contact the associated exterior surface locations of the bar 28. Following this contact continued collapse of the glove box results in the bar 28 being bent, or deflected, in the manner referenced by bar 28' in FIG. 5. The impact forces are transferred, both forwardly as shown at 98 in FIG. 5, as well as laterally, see at 100 and 102, respectively, to a number of locations structurally associated with the reinforcing bar 28, these again including the side door mounting locations 30 and 32, additional vehicle mount locations 34, 36 and 38, as well as the steering column mounting locations 40 and 42.

In this manner, the structural projections associated with the glove box's fixed inner receptacle 48 operate to deform the reinforcing bar 28 at the points of contact, and to thereby transfer significant loads to the non-critical structural support locations to which the reinforcing bar secures. As previously described, a further advantage of the present design is that it provides balance between the counter-forces exerted by a passenger actuating airbag 26 (upper torso forces) and those responsible for the controlled deformation and lower collapse of the glove box door and inner assembly 10 (lower body forces).

The deformable glove box assembly 10 operates to offset the absorptive force requirements associated with an upper body situated vehicle airbag, thereby balancing the individual absorptive requirements of both the airbag and glove box situated opposite the upper and lower body, respectively, of the user. The construction of the glove box door (e.g. inner panel 64 and outer vibration welded panel 72) is such that the door is sufficiently stiff in order to absorb an amount of impact energy and to prevent the occupant's knees 92 and 94 from contacting any overly hard surface.

In a preferred embodiment, it is desired to maintain the substantial structural integrity of the rearward structural projections 84, 86, et seq., associated with the fixed and inner glove box receptacle 48, this facilitating transferring of energy through the reinforcement bar 28, both subsequently and concurrently with additional impact forces being exerted across the instrument panel structure 12 and away from the occupant. As will now be described, there are also envisioned instances in which it is desired to modify the structural performance characteristics of the glove box receptacle 48 (i.e., its rearward structural projections) and in order to either strengthen or weaken the same in order to transfer more or less dissipating force to the reinforcing bar and surrounding structure, and relative to the other collision forces being dissipated throughout the instrument panel architecture.

In particular, and referencing FIG. 6, a partial cutaway illustration is shown at 104 of an alternate configuration, and whereby a spacing established between the glove box receptacle, i.e., its inwardly arcuately exposed end, and the reinforcement bar 28 is modified, such as by moving the bar closer (see at 28') or further (at 28) away from the opposing edge surface of the embossment/projection. Another varying parameter in the structural performance characteristics of the receptacle includes varying a selected thickness associated with a given surface of the receptacle projection (see reduced thickness inner arcuate end surface 90'), this encouraging the inner collapse of the hollowed receptacle interior to dissipate some additional force in a safe direction, as well as again to protect the user's knees from an excessive contact surface, and such as which may be posed by bar and rigid receptacle in cooperation.

Referring now to FIG. 7, a further partial cutaway illustration is shown at 106 of a yet further alternate configuration of the present invention. In this illustration, an impacting surface of the receptacle projecting structure, see again arcuate inner end surface 90, is inwardly notched, at 108, again to facilitate a degree of controlled collapse of the hollow interior structure concurrent with exerting a determined deforming force upon the reinforcing bar 28.

FIG. 8 is a still further partial cutaway illustration, at 109, of an additional ribbing structure, see ribs 112 and 114, as well as the honeycombed cutaway structure shown in FIG. 9 and referenced by cross ribs 116 and 118 in cooperation with interiorly positioned ribs 112 and 114, incorporated into the otherwise hollowed interior of the receptacle projection, e.g. again at 84. The ribs are typically integrally molded within the projecting structure, and in order to selectively strengthen the interior of the receptacle structure proximate the impact point with the reinforcement bar in a situation where it is desired to maintain additional structural integrity of the rearward projection or embossment relative to the reinforcing bar 28.

Having described my invention, other and additional preferred embodiments will become apparent to those skilled in the art. In particular, it is envisioned that the relative dimensions and structural integrity of one or more of the rearward projections/embossments may be varied to distribute collision forces in a given direction. It is also envisioned that the structural makeup and construction of the receptacle extending projections may otherwise be modified in any manner calculated to augment or coordinate with the force deforming capabilities provided by the surrounding instrument panel.

I claim:

1. A glove box assembly mounted within a vehicle instrument panel and, upon a collision event resulting in a passenger impacting the glove box, exerting a desired deformation of a reinforcing bar associated with the instrument panel following initial forward travel of the glove box to engage the reinforcement bar, said assembly comprising:
   a receptacle mounted within the instrument panel, said receptacle including a structural projection extending in a direction towards the reinforcing bar a predetermined distance from a surface of the reinforcing bar; and
   an outer panel extending over said receptacle;
   said receptacle, in response to contact by the passenger, collapsing the predetermined distance to contact the reinforcing bar, following which additional deformation forces are exerted upon the reinforcing bar.

2. The glove box assembly as described in claim 1, said receptacle further comprising an injection molded body, a facing edge of said structural projection opposing the reinforcing bar and exhibiting an inward arcuate profile.

3. The glove box assembly as described in claim 2, further comprising a plurality of individual structural projections arranged in spaced apart and opposing fashion relative to the reinforcing bar.

4. The glove box assembly as described in claim 2, further comprising a thickness associated with a selected surface of said structural projection being modified relative to an interconnecting surface.

5. The glove box assembly as described in claim 2, said inward arcuate profile being notched to facilitate a degree of controlled collapse of the hollow interior structure, concurrent with exerting a determined deforming force upon the reinforcing bar.

6. The glove box assembly as described in claim 1, further comprising at least one interior rib incorporated into an otherwise hollowed interior of said receptacle, and in order to selectively strengthen said receptacle impacting the reinforcement bar.

7. The glove box assembly as described in claim 1, further comprising an exposed surface in said outer panel within which is mounted a handle mechanism.

8. The glove box assembly as described in claim 1, further comprising a bin supported within said receptacle and secured to a door incorporating said outer panel, hinge supports extending along a lower surface of said bin and which are adapted to secure said bin in pivoting fashion within the instrument panel.

9. The glove box assembly as described in claim 8, said bin further comprising at least one side projecting support adapted to contact the instrument panel upon outward pivoting and in order to define a fully opened condition.

10. The glove box assembly as described in claim 8, an inner panel in combination with said outer panel comprising said door having a specified shape and size and being vibration welded together.

11. The glove box assembly as described in claim 8, each of said bin, door and receptacle each having a specified shape and size and being constructed of a plasticized material in an injection molded process.

12. A glove box assembly incorporated into a vehicle instrument panel along which extends a reinforcing bar, said assembly comprising:
    a three-dimensional and interiorly open receptacle fixedly mounted within the instrument panel, said receptacle including at least one structural projection extending in a direction towards the reinforcing bar;
    a rib incorporated into a hollowed interior of said receptacle, said rib strengthening said receptacle having said structural projection impacting the reinforcement bar; and
    a bin secured within said receptacle and including a door exposed to adjoining surfaces of the instrument panel;
    upon experiencing a collision event resulting in a passenger's knees impacting the door, inward deformation of said receptacle transferring forces to the instrument panel and deforming the reinforcement bar.

13. The assembly as described in claim 12, said receptacle further comprising an injection molded body, a facing edge of said structural projection opposing the reinforcing bar exhibiting an inward arcuate profile.

14. The glove box assembly as described in claim 13, further comprising a plurality of individual structural projections arranged in spaced apart and opposing fashion relative to the reinforcing bar.

15. The glove box assembly as described in claim 13, further comprising a thickness associated with a selected surface of said structural projection being modified relative to an interconnecting surface.

16. The glove box assembly as described in claim 13, said inward arcuate profile being notched to facilitate a degree of controlled collapse of the hollow interior structure, concurrent with exerting a determined deforming force upon the reinforcing bar.

17. The energy absorbing and balancing assembly as described in claim 13, further comprising a plurality of individual structural projections arranged in spaced apart and opposing fashion relative to the reinforcing bar.

18. A glove box assembly incorporated into a vehicle instrument panel along which extends a reinforcing bar, said assembly comprising:
    a receptacle mounted within the instrument panel, said receptacle including a structural projection extending in a direction towards the reinforcing bar;
    said receptacle further comprising an injection molded body, a facing edge of said structural projection opposing the reinforcing bar exhibiting an inward arcuate profile, said inward arcuate profile being notched to facilitate a degree of controlled collapse of said structural projection, concurrent with exerting a determined deforming force upon the reinforcing bar; and
    a bin secured within said receptacle and including a door exposed to adjoining surfaces of the instrument panel;
    upon experiencing a collision event resulting in a passenger's knees impacting the door, inward deformation of said receptacle transferring forces to the instrument panel and deforming the reinforcing bar.

* * * * *

UNITED STATES PATENT AND TRADEMARK OFFICE
CERTIFICATE OF CORRECTION

PATENT NO. : 7,484,792 B2  Page 1 of 1
APPLICATION NO. : 11/349503
DATED : February 3, 2009
INVENTOR(S) : Benjamin Warren Penner It is certified that error appears in the above-identified patent and that said Letters Patent is hereby corrected as shown below:

Column 8, line 22, replace "reinforcement" with --reinforcing--

Signed and Sealed this

Twenty-first Day of April, 2009

JOHN DOLL
*Acting Director of the United States Patent and Trademark Office*